US009262103B2

(12) United States Patent
Nitta et al.

(10) Patent No.: US 9,262,103 B2
(45) Date of Patent: Feb. 16, 2016

(54) IMAGE FORMING APPARATUS HAVING ENERGY SAVING FUNCTION TO CHANGE FROM NORMAL OPERATION MODE TO POWER-SAVING MODE, AND RECORDING MEDIUM THEREOF

(71) Applicant: KYOCERA Document Solutions Inc., Osaka (JP)

(72) Inventors: Tsuyoshi Nitta, Osaka (JP); Satoshi Kawakami, Osaka (JP); Yuri Moritani, Osaka (JP); Yoshitaka Matsuki, Osaka (JP); Masaya Okuda, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/678,321

(22) Filed: Apr. 3, 2015

(65) Prior Publication Data

US 2015/0286448 A1    Oct. 8, 2015

(30) Foreign Application Priority Data

Apr. 3, 2014    (JP) .................................. 2014-076776

(51) Int. Cl.
*G06F 1/32*    (2006.01)
*G06F 3/12*    (2006.01)

(52) U.S. Cl.
CPC ............ *G06F 3/1221* (2013.01); *G06F 3/1229* (2013.01)

(58) Field of Classification Search
None
See application file for complete search history.

(56) References Cited

U.S. PATENT DOCUMENTS

| 5,950,037 A * | 9/1999 | Ko ......................... | B41J 29/393 |
| | | | 399/38 |
| 6,305,602 B1 * | 10/2001 | Grabowski ........... | H03K 17/945 |
| | | | 235/379 |
| 8,718,493 B2 * | 5/2014 | Nagata ............... | G03G 15/5004 |
| | | | 271/176 |
| 8,817,341 B2 * | 8/2014 | Yoshioka ........... | H04N 1/00496 |
| | | | 358/1.13 |
| 8,938,632 B2 * | 1/2015 | Konosu .............. | H04N 1/00835 |
| | | | 713/320 |

FOREIGN PATENT DOCUMENTS

JP    2012-137746 A    7/2012

* cited by examiner

*Primary Examiner* — Paul F Payer
(74) *Attorney, Agent, or Firm* — Hawaii Patent Services; Nathaniel K. Fedde; Kenton N. Fedde

(57) ABSTRACT

Provided is an image forming apparatus that performs appropriately changing to the power-saving mode according to environment (luminosity) of a place that user exists, without increasing in a cost. When there is access from a portable terminal, communication circuit requests to the portable terminal for transmission of illuminance information detected by an illuminance sensor in a side of the portable terminal. Then, based on the illuminance information, mode switching circuit changes to the power-saving mode.

6 Claims, 3 Drawing Sheets

IMAGE FORMING APPARATUS HAVING ENERGY SAVING FUNCTION TO CHANGE FROM NORMAL OPERATION MODE TO POWER-SAVING MODE, AND RECORDING MEDIUM THEREOF

INCORPORATION BY REFERENCE

This application is based on and claims the benefit of priority from Japanese Patent Application No. 2014-076776 filed on Apr. 3, 2014, the contents of which are hereby incorporated by reference.

BACKGROUND

The present disclosure is related with has an energy saving function that performs changing from a normal operation mode to a power-saving mode, automatically, the image forming apparatus, and recording medium.

In an image forming apparatuses, such as a typical MFP (Multifunction Peripherals) or a printer, has an energy saving function. An energy saving function is a function to perform changing from normal operation mode to the power-saving mode, automatically, in cases of having no operation for a definite period of time. By the energy saving function, power consumption can be reduced in a standby state. Here, a low power mode and a sleep mode are examples of the power-saving mode.

The low power mode is an operational mode that makes a touch panel and a light turn off, for example. In the low power mode, when printing data or a FAX message is received, it restores to normal operation mode, automatically. Then, printing is performed. Also, a sleep mode is an operational mode that makes the touch panel and the light turn off and stops the electric power supply to a fixing part. In the sleep mode, as compared with the low power mode, it may need time to start printing. However, the sleep mode has a higher power saving effect.

In addition, time to proceed from the normal operation mode to the low power mode can be set up, arbitrarily. Also, time to proceeds from the low power mode to the sleep mode can be set up, arbitrarily. In addition, the low power mode may not be equipped depending on a model. In this case, time to proceeds from the normal operation mode to the sleep mode can set up, arbitrarily. Also, for example, in cases of having operated touch panel or having an access from a portable terminal, it proceeds from the low power mode or the sleep mode to normal operation mode.

In a typical image forming apparatus that has such the energy saving function, the illuminance sensor is equipped in the apparatus and detects a luminosity outside of the apparatus, and it performs power saving control. In the apparatus, when the luminosity outside of the apparatus is detected with the illuminance sensor, for example, in case of being dark, it changes to the power-saving mode, automatically.

SUMMARY

An image forming apparatus according to an embodiment of the present disclosure includes a communication circuit and a mode switching circuit. The communication circuit communicates with a portable terminal that has an illuminance sensor. The mode switching circuit changes from normal operation mode to the power-saving mode based on the power-saving time set up arbitrarily, if there is no operation for a definite period of time. The communication circuit, when there is access from the portable terminal, transmission of the illuminance information detected by the illuminance sensor is requested to the portable terminal. The mode switching circuit changes to the power-saving mode based on the illuminance information.

A non-transitory computer-readable recording medium according to an embodiment of the present disclosure is stored image forming program executable by the computer. The image forming program includes a program code that cases the computer to communicate with a portable terminal that has an illuminance sensor. Also, the program includes a program code that cases the computer to change from the normal operation mode to the power-saving mode based on a power-saving time set up arbitrarily when there is no operation for a definite period of time. The program includes a program code that cases the computer to require transmission of illuminance information detected by the illuminance sensor to the portable terminal when having access from the portable terminal. Then, the program includes a program code that cases the computer to change to the power-saving mode based on the illuminance information.

DETAILED DESCRIPTION

Hereinafter, one embodiment of the image forming apparatus in the present disclosure is described, as refer to FIG. 1-FIG. 3. In addition, an example of the image forming apparatus in the following explanation is an MFP (Multifunction Peripheral). The MFP is complex peripheral equipment that equips a plurality of functions, such as a printer function, a facsimile function, and a scanning function, for example.

Also, for example, the MFP can download the print job registered into the print server via a network and can be output by performing image processing (rasterize). Also, registration of the print job to the print server is performed by a client terminal, for example. Also, for example, the printing request to the MFP can be performed not only operation with a touch panel of the MFP but with a portable terminal.

Figure 1:
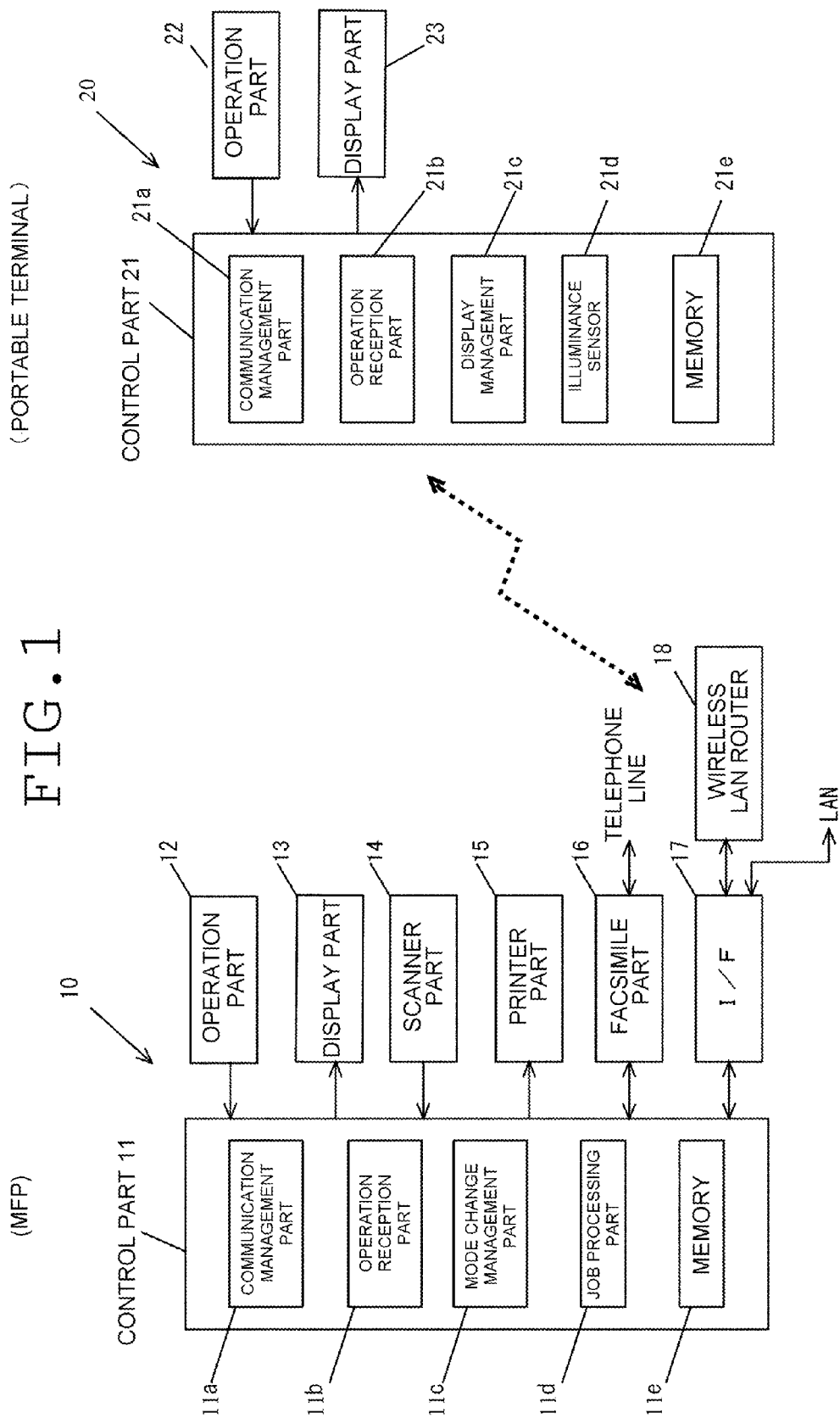
FIG. 1 shows an example of the internal configuration of the image forming apparatus in the present disclosure.

First, MFP10 shown in FIG. 1 can communicate with portable terminal 20 via wireless LAN. Here, MFP10 includes control part 11, operation part 12, display part 13, scanner part 14, printer part 15, facsimile part 16, and I/F (interface) 17. Control part 11 controls operation of MFP 10 entirely based on a program in ROM, which is not illustrated. Control part 11 includes communication management part 11a (communication part), operation reception part 11b, mode change management part 11c (mode switching part), job processing part 11d, and memory 11e.

Communication management part 11a is a circuit that receives the print job from a print server via LAN connected to I/F 17, for example. The print job received from the print server is sent to job processing part 11d. Also, communication management part 11a requests transmission of illuminance information of portable terminal 20. Also, communication management part 11a receives the printing request and illuminance information from portable terminal 20. In this case, also, communication management part 11a transmits and receives via wireless LAN router 18, which is connected to I/F 17. In addition, communication between communication management part 11a and an after-mentioned communication management part 21a in portable terminal 20, for example, in the portable terminal 20 side, continues after starting an exclusive application until it closes. In this case, closing of portable terminal 20 includes the notice of the end.

Operation reception part 11b is a circuit that accepts operation of specifying the print job by operation part 12, or the like. Mode change management part 11c is a circuit that changes the operational mode of MFP 10 from normal operation mode to the power-saving mode, if there is no operation for a definite period of time. Here, normal operation mode is an operational mode that performs to supply electric power to drive circuits, such as an electrifying device and a fixing roller and makes restore to the state where a requested process can be executed. Also, as mentioned above, in the power-saving mode, there are the low power mode and the sleep mode. Also, as mentioned above, low power mode is not equipped as depended on a model.

In addition, transition to normal operation mode from the power-saving mode, for example, is carried out in cases where the touch panel is operated or in cases where there is access from portable terminal 20. Also, it proceeds from normal operation mode to the power-saving mode in time set up arbitrarily (henceforth power-saving time.)
Also, the transition from normal operation mode to the power-saving mode is carried out based on the illuminance information from portable terminal 20. In addition, power-saving time is specified and set up, generally, to specified minutes or hours after a specific process is completed, or the like.

Job processing part 11d is a circuit that executes image processing (rasterize) to the print job downloaded from the print server. Memory 11e is a circuit that stores the print job or the like, which is downloaded from the print server, therein.

Operation part 12 is a circuit that is operated in cases of specifying the print job registered into the print server or the like. Operation part 12 includes, for example, a touch panel. In addition, a printing request for MFP 10, or the like, a login process is carried out in order to obtain utilization right for a user. The login process is carried out by using operation part 12, or it is carried out via an exclusive application in portable terminal 20. Display part 13 is a circuit that shows a specified print job, a message to guide login or the like, the list of print jobs that the user can print, or the like.

Scanner part 14 is a circuit that inputs an image data of a manuscript read by an image sensor to control part 11. That is, scanner part 14 converts an image signal of the manuscript from an image sensor into digital image data. Then, scanner part 14 inputs the image data to control part 11, sequentially.

Printer part 15 is a circuit that prints an image on a paper based on the image data output from control part 11. That is, printer part 15 forms an electrostatic latent image on a photo conductor drum by modulated laser beam based on rasterized image data that is output from control part 11. Then, a toner image is formed of the electrostatic latent image by supply of a toner, and this toner image is transferred to the paper.

Facsimile part 16 is a circuit that transmits the image data output from control part 11 to the facsimile serving as the other party via a telephone line. Also, facsimile part 16 receives the image data from a facsimile serving as the other party and inputs it to control part 11. Namely, facsimile part 16, while controlling connection with the telephone line, compresses and modulates the image data outputted from control part 11 and transmits it to the other party facsimile. Also, facsimile part 16, while connecting with the telephone line, restores and decompresses the image data from the other party facsimile and inputs it to control part 11. I/F 17 is a circuit that is connected to, for example, wireless LAN router 18 or LAN. I/F 17 performs transmission and reception of the data between portable terminal 20, a client terminal, and a print server.

In addition, in the job of a copy function, image data is input to memory 11e from scanner part 14. Also, in the job of a copy function, image data is output to printer part 15 from memory 11e. In the job of a print function, the image data rasterized by job processing part 11d is output to printer part 15. In the job of a scanner function, the image data is input to memory 11e from scanner part 14. Also, in the job of a scanner function, image data is output to I/F 17 from memory 11e.

In the job of a fax transmission function, image data is input to memory 11e from scanner part 14 or I/F 17. Also, in the job of a fax transmission function, image data is output from memory 11e to facsimile part 16. In the job of a fax receiving function, image data is input from facsimile part 16 to memory 11e. Also, in the job of a fax receiving function, image data is output from memory 11e to printer part 15.

Also, the login process is performed in cases of performing pull prints a print job from MFP 10. In this case, the print job is registered into the print server. This login process is executed in order to confirm utilization right of the user by using operation part 12, portable terminal 20, or the like. In the login process, user authentication information is transmitted to the print server via LAN.

Also, when user authentication is performed in the print server, the list of the print jobs that the user can print is acquired in MEP 10. In this case, MFP 10 shows the list on display part 13. Also, in cases where the login process is performed from portable terminal 20, the list of the print jobs that the user can print is shown on display part 23 (after-mentioned) in portable terminal 20. Then, the user operates operation part 22 in MFP 10 or operation part 22 in portable terminal 20 and selects the job to print. In that case, the specified print job is downloaded from a print server and is stored in memory 11e. The print job stored in memory 11e is rasterized by job processing part 11d. In this case, job processing part 11d rasterizes PDL data according to setting data to specify print setting, which is included in the print job. Then, based on the rasterized image data, the image is printed on a paper.

On the other hand, portable terminal 20 that can transmit a printing request or the like to MEP 10 includes control part 21, operation part 22, and display part 23. In addition, a smart phone, a tablet, or the like, can be used as portable terminal 20. Control part 21 is a circuit that controls entire operation of portable terminal 20 based on a program in ROM that is not illustrated. Control part 21 includes communication management part 21a, operation reception part 21b, display management part 21c, illuminance sensor 21d, and memory 21e.

Communication management part 21a is a circuit that performs wireless communications with communication management part 11a in MFP 10 via wireless LAN router 18 as mentioned above. For example, the wireless communications can be performed by starting the exclusive application. Also, by starting the exclusive application, the login process for confirming utilization right of the user as mentioned above can be performed. Also, transmission of the information that shows the printing request to MFP 10, or the like, is enabled. Also, when a request for illuminance information is received from MFP 10, transmission of the illuminance information detected by illuminance sensor 21d can be performed.

Also, when user authentication is performed by the print server, information including the list of the print jobs that the user can print is received. Also, when the exclusive application started in portable terminal 20 is closed, information that shows the notice of the end is transmitted.

Operation reception part 21b is a circuit that accepts the contents operated by using operation part 22. Display management part 21c is a circuit that shows various types of information, for example, the exclusive application for performing a printing request or the like to MFP 10 on display part 23, or the like. Memory 21e is a circuit that stores programs, such as the exclusive application, therein. Operation part 22 is a circuit that is operated in cases of performing specification of the print job registered into the print server, or the like. Operation part 22 includes a touch panel, for example. Display part 23 is a circuit that shows the list of the message to guides login or the like, and print jobs that the user can print, or the like when the exclusive application is started.

(Process in the Side of the Portable Terminal)

Figure 2:
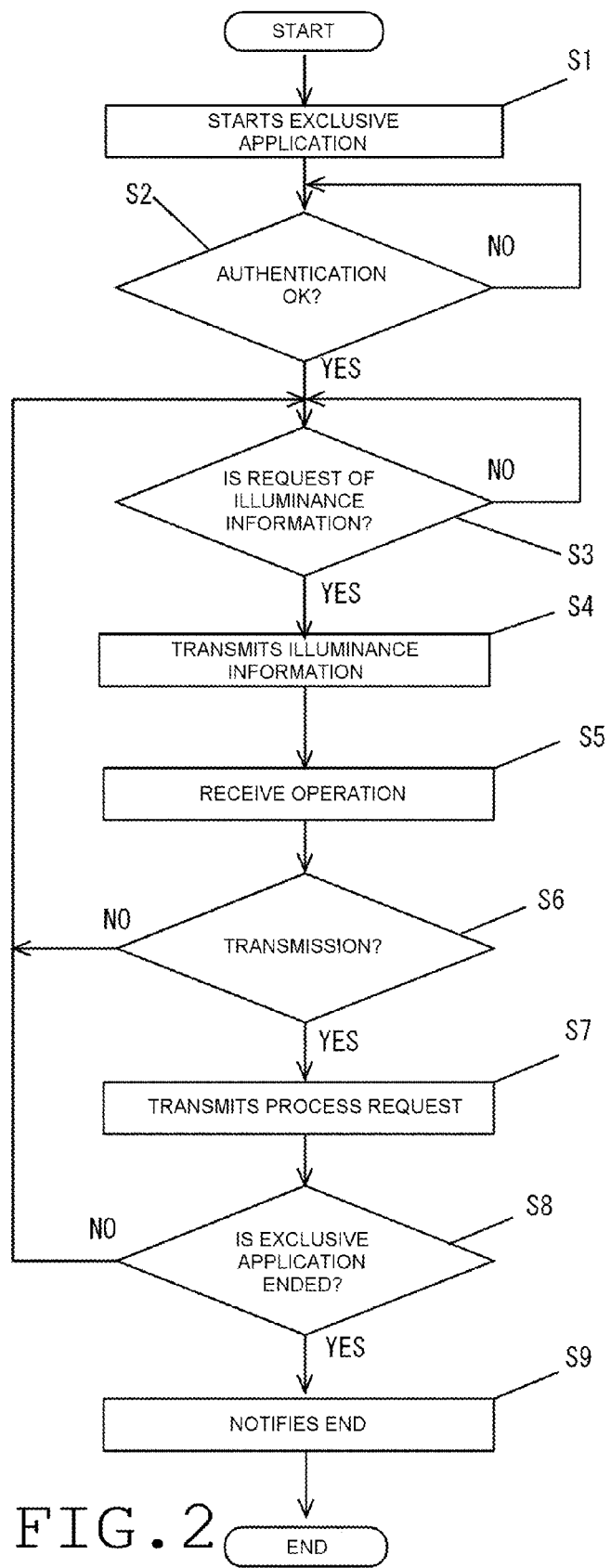
FIG. 2 shows the step of operation in the side of the portable terminal shown in FIG. 1.

Next, with reference to FIG. 2, a process in the side of portable terminal 20 is explained. In addition, in following, a case where a printing request is given to MFP 10 from portable terminal 20 is explained. First, control part 21 in portable terminal 20 starts the exclusive application (Step S1). In that case, display management part 21c shows contents that urges login to display part 23. In addition, at the time of start of the exclusive application, communication with communication management part 21a and communication management part 11a in MFP 10 is established.

Here, when operation reception part 21b accepts input of unique ID of the user, the password, or the like, user authentication is performed by the print server side as mentioned above. In the side of portable terminal 20, it waits for authentication (Step S2: NO). Login is performed if authentication is OK (Step S2: YES). In that case, communication management part 21a acquires the list of the print jobs that the user can print. Display management part 21c shows the acquired list of the print jobs on display part 23.

Here, it waits for a request of the illuminance information from MFP 10 (Step S3: NO). When there is the request of the illuminance information (Step S3: YES), a process is advanced. Then, communication management part 21a transmits the illuminance information detected by illuminance sensor 21d to MEP 10 (Step S4). In addition, the request of the illuminance information from MEP 10 is carried out at a specific interval until the display of the exclusive application is ended (closing.)

Thereby, from portable terminal 20, the illuminance information detected by illuminance sensor 21d is transmitted according to the request.

Also, when a print job is selected by operation in operation part 22, operation reception part 21b accepts the selected print job (Step S5). In this case, number of sheets for printing, or the like, can be specified by operation in operation part 22.

After selection of a print job, specification of number of sheets for printing, or the like, is completed, for example, a transmission button, which is not illustrated, on display part 23 is operated. In that case, communication management part 21a determines to have a transmission (Step S6: YES). Then, the information that shows a process request is transmitted to MFP 20 side (Step S7). In addition, it waits for transmission until the transmission button is operated (Step S6: NO).

Then, after transmitting the process request, the end button on display part 23 that is not illustrated is operated. In that case, the display of the exclusive application is ended (closing) (Step S8: YES).

At this time, communication management part 21a notifies the information that shows the end to communication management part 11a in the side of MFP 10 (Step S9). Thereby, communication between communication management part 21a and communication management part 11a in the side of MFP 10 is intercepted, immediately.

In addition, if the end button on display part 23, which is not illustrated, is not operated after transmitting the process request (Step S8: NO), control part 21 ends (closing) the display of the exclusive application after a definite period of time (for example, after 20 seconds.)

Thereby, even if the user does not make the exclusive application close, the display of the exclusive application is ended (closing) automatically, and communication with communication management part 21a and communication management part 11a in the side of MFP 10 is intercepted.

Also, communication between communication management part 21a and communication management part 11a in the side of MFP 10 is established at the time of start of the exclusive application in step S1. However, the user may close the exclusive application without performing login in MFP 10 depending on the case. In this case, the information that shows the end in Step S9 is notified. Also, if no operations are performed with the exclusive application started, after a definite period of time (for example, after 20 seconds), the information that shows the end in Step S9 is notified.

(Process in the Side of the MFP)

Figure 3:
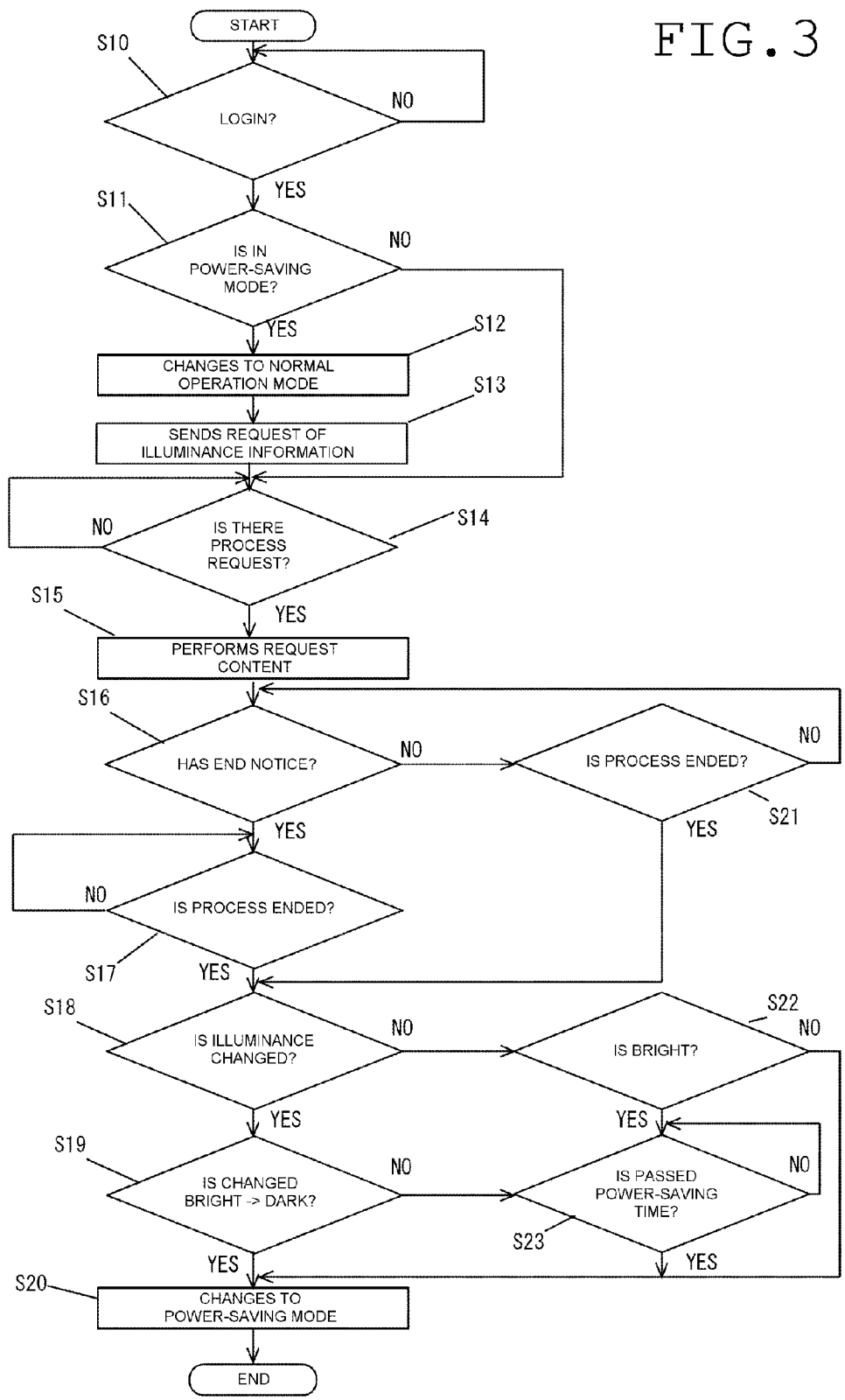
FIG. 3 shows the step of operation in the side of the image forming apparatus shown in FIG. 1.

Next, with reference to FIG. 3, the process in the side of MFP 10 is explained. In addition, in the following, it explains that the authentication in the side of portable terminal 20 is OK. Also, an example in which MFP 10 is installed inside a room where an employee exists is shown. First, in the side of MFP 10, it is in a state of waiting the login from the side of portable terminal 20 (Step S10: NO). A process is advanced when there is login from the side of portable terminal 20 (Step S10: YES). Then, mode change management part 11c determines the operational mode in the side of MFP 10 (Step S11). Here, while being the power-saving mode (Step S11: YES), mode change management part 11c changes the operational mode in the side of MFP 10 to the normal operation mode (Step S12). On the other hand, if it is not the power-saving mode (Step S11: NO), mode change management part 11c does not change the operational mode.

Next, communication management part 11a transmits a request to send of illuminance information to the side of portable terminal 20 (Step S13). The request to send of illuminance information here is performed at a specific interval until communication with portable terminals 20 is finished. This is for making change to the power-saving mode appropriately with corresponding to the environment (luminosity) of the place in the user. The detail is described later.

Also, it becomes waiting the process request from the side of portable terminal 20 (Step S14: NO). Communication management part 11a, when determining to have the process request (Step S14: YES), downloads the print job according to the process request from the print server. Then, job processing part 11d performs image processing (rasterize) to the print job downloaded from the print server. Also, printer part 15 prints the image on a paper based on the image data output from control part 11 (Step S15).

Next, communication management part 11a determines having the notice of the end (Step S16). If having the notice of the end (Step S16: YES), job processing part 11d advance a process. Then, job processing part 11d determines whether or not the process in the side of MFP 10 is completed (Step S17). Here, if the process in the side of MFP 10 is not completed, it becomes waiting for the end of the process (Step S17: NO). On the other hand, after the process is completed (Step S17: YES), mode change management part 11c advances a process. Then, mode change management part 11c determines whether or not the illuminance is changed based on the illuminance information from portable terminal 20 (Step S18).

If the illuminance is changed (Step S18: YES), mode change management part 11c advances a process. Then, mode change management part 11c determines whether or not the illuminance changes from bright to dark (Step S19). Here, if the illuminance is determined to be changed from bright to dark (Step S19: YES), mode change management part 11c advances a process. Then, mode change management part 11c immediately changes the operational mode in the side of MFP 10 to the power-saving mode (Step S20). Namely, the situation that the illuminance changes from bright to dark means that access from portable terminal 20 is performed, for example, just before being started a lunch break. In this case, as mentioned above, when the lunch break starts, it means turning off the electric light and changing from the bright state to the dark state in the interior of the room because all the people are out of the room, for example. In this case, it is predicted that there is almost no use of MEP 10. Therefore, even if it changes to the power-saving mode immediately, trouble does not happen at all.

Also, if the illuminance is determined not to change from bright to dark (Step S19: NO), a process is advanced. Then, power-saving passage of time is determined as mentioned below (Step S23). Namely, the case, which the illuminance is changed and the illuminance is not changed from bright to dark, is that the illuminance is changed from dark to bright. This shows, for example, a case that accesses from portable terminal 20 just before being finished the lunch break. This case shows, after the lunch break finishes, the electric light is turned on, and it is changed from the dark state to the bright state in the interior of the room. In this case, as after-mentioned, after the power-saving time passes, it changes to the power-saving mode.

On the other hand, in Step S16, if there is no notice of the end (Step S16: NO), job processing part 11d advances a process. Then, job processing part 11d determines whether or not the process in the side of MFP 10 is completed (Step S21). Here, if the process in the side of MFP 10 is not completed, it becomes waiting of the end of the process (Step S21: NO). If there is the notice of the end in Step S16 at the time of the waiting for the end of the process, it proceeds to Step S17.

Then, after the process in the side of MFP 10 is completed (Step S21: YES), it proceeds to Step S18. Also, if there is no change in the illuminance in Step S18 (Step S18: NO), mode change management part 11c determines whether or not the illuminance is bright (Step S22). Here, if the illuminance is bright (Step S22: YES), it becomes waiting for passing the power-saving time (Step S23: NO). When the power-saving time passes (Step S23: YES), mode change management part 11c changes the operational mode in the side of MFP 10 to the power-saving mode (Step S20).

Namely, in case of being determined the illuminance is bright in Step S22, for example, it is not within a time zone of the lunch break but an office time zone. Therefore, the process according to the setup of the power-saving time is performed.

Also, in Step S22, if it is determined that illuminance is not bright (Step S22: NO), mode change management part 11c advances a process. Then, mode change management part 11c changes immediately the operational mode in the side of MFP 10 to the power-saving mode (Step S20). That is, the case that the illuminance is not bright shows, for example, it has access from portable terminal 20 in Step S22 during the time zone of the lunch break. In this case, as mentioned above, it is predicted that there is almost no use of MFP 10. Therefore, even if it changes to the power-saving mode immediately, trouble does not happen.

Thus, in the present embodiment, if it has access from portable terminal 20, communication management part 11a that is a communication part requests transmission of the illuminance information detected by illuminance sensor 21d in the side of portable terminal 20 to the portable terminal 20. Then, the change to the power-saving mode is performed by mode change management part 11c that is a mode switching part based on the illuminance information.

Specifically, the request of transmission of the illuminance information is made by communication management part 11a at the specific interval until the communication with portable terminal 20 stops. Then, if the illuminance based on the illuminance information changes from bright to dark, immediately after the process of the request content from portable terminal 20 is completed, it is performed changing to the power-saving mode by mode change management part 11c. If the illuminance based on the illuminance information changes from dark to bright, the process of the request content from portable terminal 20 is be completed in addition to pass the power-saving time, change to the power-saving mode is performed.

Also, if there is no change in the illuminance based on the illuminance information and the illuminance is dark, changing to the power-saving mode is performed immediately by mode change management part 11c after the process of the request content from portable terminal 20 is completed. Also, if the illuminance is bright, after the process of the request content from portable terminal 20 is completed and it passes the power-saving time, changing to the power-saving is performed.

Thereby, since the illuminance information is acquired from the side of portable terminal 20, there is no necessary to have illuminance sensor 21d in the side of MEP 10. Also, environment (luminosity) of the place where the user exists, is confirmed based on the illuminance information detected by illuminance sensor 21d in the side of portable terminal 20. Therefore, it is not influenced by the environment (luminosity) in the side of MEP 10.

That is, MFP 10 is installed in the same place in the place where a plurality of employees exist, as mentioned above, and it is installed near a window. In this case, if the electric light is turned off in the time zone of the lunch break, although environment becomes dark, the surroundings of MFP 10 may not become dark by outdoor daylight. In such a situation, if there is access from portable terminal 20 just before the lunch break starts, change from bright to dark of the illuminance based on the illuminance information from portable terminal 20 can be confirmed. Thereby, it can predict that there is almost no use of MFP 10 and can change to the power-saving mode, immediately.

On the other hand, the case where MFP 10 is installed in a place other than the place where an employee exists is explained. For example, even if the electric light in the place where an employee exists is turned off within the time zone of the lunch break, the electric light in the place where MFP 10 is installed may not be turned off. Even in this case, change from bright to dark of the illuminance based on the illuminance information from portable terminal 20 can be confirmed as like the above. Thereby, it can predict that there is almost no use of MFP 10 and can change to the power-saving mode, immediately.

In this way, in the present embodiment, the change to the power-saving mode is performed based on the illuminance information detected by illuminance sensor 21d in the side of portable terminal 20. Therefore, the change to the power-saving mode according to the environment (luminosity) of the place where the user exists can be performed appropriately. In addition, no cost-up is happened.

When it explains in detail, in a typical image forming apparatus, the environment (luminosity) of the place currently installed is taken into consideration, and it changes to the power-saving mode, automatically. Thereby, it is thought that reduction of the power consumption may be attained under standby. That is, if dark in the circumference where the image forming apparatus is installed, there may be almost no use of the image forming apparatus in some cases. Therefore, waiting power consumption is reduced by changing to the power-saving mode, automatically.

However, in a typical image forming apparatus, as depended on the installed environment of the image forming apparatus, there is a case where the change to the power-saving mode is not performed appropriately according to the environment (luminosity) of the place where the user exists. That is, the case where the image forming apparatus is installed in an office where employees are working is considered. In this case, the image forming apparatus is installed near the window. Also, as depended on a place of work, the electric light may be turned off in the time zone of the lunch break.

In such a situation, when the image forming apparatus is installed near the window, in the time zone of fine daytime, outdoor daylight is irradiated. Here, when the electric light is turned off in the time zone of the lunch break, the interior of the room becomes dark, for example. However, the circumference of the image forming apparatus may not become dark by the outdoor daylight.

In this case, since employees move to a restaurant or the like from the place where the image forming apparatus is installed, it is predicted that there is almost no use of the image forming apparatus. Therefore, automatically changing to the power-saving mode is preferred. However, the surroundings of the image forming apparatus do not become dark by outdoor daylight. Therefore, even if it is a case where there is almost no use of the typical image forming apparatus, the change to the power-saving mode is not performed, automatically.

In addition, an image forming apparatus may be installed in a place other than the place where an employee exists. In this case, for example, even if the electric light of the place where the employee exists is turned off in the time zone of the lunch break, as mentioned above, there is a case where the electric light of the place where the image forming apparatus is installed is not turned off. In such a situation, it is also predicted that there is almost no use of the image forming apparatus. Therefore, changing to the power-saving mode automatically is preferred. However, the change to the power-saving mode is not automatically performed by the typical image forming apparatus because the circumference is not become dark by the environmental light.

Also, in a typical image forming apparatus, the illuminance sensor is equipped in itself. Therefore, when documents or the like are placed on the surroundings of the illuminance sensor, even if it is bright interior of a room, there is a case where detection that it is dark in the surroundings of the typical image forming apparatus. Moreover, since an illuminance sensor is equipped in the typical image forming apparatus, the cost may be increased.

The image forming apparatus in the present disclosure changes to the power-saving mode according to the environment (luminosity) of the place where the user exists can be performed appropriately without increasing a cost. That is, according to the image forming apparatus, an image forming method, and the recording medium in the present disclosure, change to the power-saving mode based on the illuminance information detected by the illuminance sensor in the side of the portable terminal. Therefore, a cost is not increased, and changing to the power-saving mode according to the environment (luminosity) of the place where the user exists can be performed, appropriately.

In addition, in the present embodiment, it is explained a case where changing to the power-saving mode is performed based only on the illuminance information from portable terminal 20, which is accessed to MFP 10. However, it does not limit to this example. For example, the specific area with limits to MFP 10 may be set. That is, based on the illuminance information from portable terminal 20, which exists only in the area, changing to the power-saving mode may be performed.

In this case, communication management part 11a acquires the position information from location sensors, such as a GPS sensor equipped in portable terminal 20. Then, mode change management part 11c determines a position of portable terminal 20 by the position information. Next, mode change management part 11c determines whether or not the position of portable terminal 20 is in the specific area based on the position in MFP 10. If the portable terminal 20 is in the specific area, mode change management part 11c performs changing to the power-saving mode based on the illuminance information from the portable terminal 20.

The specific area can be a circle that has a specific radius centering on the position in MFP 10, for example. In this case, mode change management part 11c can compute the distance from MFP 10 to the portable terminal 20 based on the position of the portable terminal 20 and the position of MFP 10. If the distance is equal to or less than a specific radius, changing to the power-saving mode is performed based on the illuminance information from the portable terminal 20. In addition, MFP 10 can store the position information of the self-apparatus in memory 11e.

As configured in this way, the place of the user who expects to use MFP 10 frequently is determined. Then, the environment (luminosity) of the determined place can be confirmed certainly. Thereby, it is possible to change to the power-saving mode more appropriately.

Furthermore, the present embodiment is explained a case where an image forming apparatus is referred as MFP 10. However, of course not only in this example, it may be applied to a printer.

What is claimed is:

1. An image forming apparatus comprising:
a communication circuit that communicates with a portable terminal having an illuminance sensor; and
a mode switching circuit that changes the image forming apparatus from a normal operation mode to a power-saving mode based on a preset power-saving time; and
the communication circuit requests from the portable terminal transmission of illuminance information detected by the illuminance sensor, and
the mode switching circuit changes to the power-saving mode based on the illuminance information received from the portable terminal.

2. The image forming apparatus according to claim 1, wherein
the communication circuit requests transmission of the illuminance information at a specific interval until communication with the portable terminal is interrupted, and
if the illuminance based on the illuminance information changes from bright to dark, the image forming apparatus changes to the power-saving mode immediately after the processing of a request for transmission of illuminance information from the communication circuit to the portable terminal has completed.

3. The image forming apparatus according to claim 2, wherein if the illuminance based on the illuminance information changes from dark to bright, changes to the power-saving mode after a process of a request content from the portable terminal is completed and the power-saving time has passed.

4. The image forming apparatus according to claim 2, wherein if there is no change in the illuminance based on the illuminance information received from the portable terminal and the illuminance based on the illuminance information is dark, the image forming apparatus changes to the power-saving mode immediately after the processing of a request for transmission of illuminance information from the communication circuit to the portable terminal has completed, and, if the illuminance based on the illuminance information is bright, the image forming apparatus changes to the power-saving mode after the processing of a request for transmission of illuminance information from the communication circuit to the portable terminal has completed and further passes the power-saving time.

5. The image forming apparatus according to claim 1, wherein the communication circuit acquires position information acquired by a location sensor from the portable terminal having the location sensor, and the mode switching circuit computes a distance to the portable terminal based on the position information acquired by the communication circuit and changes the image forming apparatus to the power-saving mode based on the illuminance information from the portable terminal when it has been determined that the portable terminal is in a specific area.

6. A non-transitory computer-readable recording medium storing an image forming program executable by a computer, the image forming program comprising program code that causes the computer to:

communicate with a portable terminal having an illuminance sensor;

change from a normal operation mode to a power-saving mode based on a preset power-saving time;

request from the portable terminal transmission of illuminance information detected by the illuminance sensor to the portable terminal when having access from the portable terminal; and change to the power-saving mode based on the illuminance information.

* * * * *